United States Patent
Eichenberger et al.

(10) Patent No.: US 6,905,257 B2
(45) Date of Patent: Jun. 14, 2005

(54) OPTICAL INTERFACE FOR 4-CHANNEL OPTO-ELECTRONIC TRANSMITTER-RECEIVER

(75) Inventors: Jerome Eichenberger, Los Angeles, CA (US); Chris Lee Keller, Torrance, CA (US); Shuhei Toyoda, Nagoya (JP); Yasunori Iwasaki, Nishikasugai-gun (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/217,775

(22) Filed: Aug. 12, 2002

(65) Prior Publication Data

US 2003/0072537 A1 Apr. 17, 2003

Related U.S. Application Data

(63) Continuation-in-part of application No. 09/790,246, filed on Feb. 20, 2001.

(51) Int. Cl.⁷ ................................................. G02B 6/36
(52) U.S. Cl. .............................. 385/89; 385/88; 385/92; 385/14; 385/24; 385/114; 359/115; 359/124; 359/154; 359/163; 359/173
(58) Field of Search .............................. 385/89, 88, 92, 385/14, 24, 114; 359/115, 124, 154, 163, 173

(56) References Cited

U.S. PATENT DOCUMENTS

| | | | | |
|---|---|---|---|---|
| 4,739,404 A | * | 4/1988 | Richardson | ................ 348/719 |
| 5,067,830 A | | 11/1991 | McAlpine et al. | |
| 5,093,879 A | | 3/1992 | Bregman et al. | ............. 385/93 |
| 5,940,562 A | * | 8/1999 | Henson et al. | ................ 385/88 |

* cited by examiner

Primary Examiner—Tarifur R. Chowdhury
Assistant Examiner—George Y. Wang
(74) Attorney, Agent, or Firm—Law Offices of Natan Epstein

(57) ABSTRACT

Optoelectronic transceiver modules having photoemitter and photodetector arrays spaced from each other are interfaced to a single optical fiber ribbon having evenly spaced optical fibers.

10 Claims, 11 Drawing Sheets

OPTICAL INTERFACE FOR 4-CHANNEL OPTO-ELECTRONIC TRANSMITTER-RECEIVER

This application is a Continuation-In-Part of U.S. Ser. No. 09/790,246, Filed Feb. 20, 2001.

BACKGROUND OF THE INVENTION

1. Field of the Invention

This invention relates generally to the field of optical fiber data transmission and communication and more particularly concerns an optical interface in the form of an optical interface for interconnecting a 4-channel optoelectronic transmitter-receiver module and an 8-fiber optical fiber transmission ribbon.

2. Background of the Invention

Optoelectronic transmitter-receiver or transceiver modules serve to convert electronic signal to optical signals for transmission via optical fibers and also to convert optical signals received via optical fibers to electronic signals. The signals processed by the optoelectronic transmitter-receiver modules typically consist of digital signals exchanged between two electronic data processing systems or subsystems, for example, in high speed digital data processing systems such as digital telephone switchboards and digital computers. Each system or subsystem is provided with such a module and the two modules are interconnected by an optical fiber transmission cable.

The optoelectronic transmitter-receiver module generally consists of a housing, a number of integrated circuit chips mounted in the housing, a laser diode array driven for emitting pulses of light into the optical fiber cable and a photo-detector diode array for detecting light pulses received from the optical fiber cable. The laser diode array operates as the optical transmitter while the photodetector diode array serves as the optical receiver. The transmitter and the receiver are contained in a common housing or package. Electrical drive signals applied to the laser diodes are converted to light pulses, while light signals received by the photodetector diodes are converted to electrical signals for processing by appropriate electronic circuits in the transceiver module. Each laser diode/photodetector diode supports one channel of communication, and multiple laser diode/photodetector diode arrays support multi-channel communication. Multi-channel optoelectronic transceivers require multiple optical fiber interconnections, a need which is frequently met by use of flat ribbons made up of parallel optical fibers. The optical fiber ribbons are commercially available in different standard widths, most commonly 4-fiber, 8-fiber and 12-fiber ribbons. The ribbons are terminated at opposite ends with corresponding 4-fiber, 8-fiber or 12-fiber optical ribbon connectors, such as industry standard MPO or MTP® optical fiber connectors. The fiber ends of the ribbon lie in a common plane and form a linear array of evenly spaced fiber ends. The termination of optical fiber ribbons represents a significant cost in the manufacture of these systems because the fiber ends in the ribbon must be polished very accurately. For this reason, it is generally desirable to minimize the number of ribbon terminations in a given system.

For example, 4-channel optoelectronic transceivers call for bi-directional 4-channel optical fiber interconnections, that is for an 8-fiberribbon with 4 optical fibers in each direction of the cable. A difficulty arises in the construction of such multi-channel optoelectronic transceivers in that the laser diode transmitter arrays and the photodetector diode receiver arrays consist of separate semiconductor chips which necessarily are mounted at a small distance apart from each other in the transceiver package. The laser and photodetector diodes cannot be manufactured on a single chip in order to maintain even spacing between all diodes and thus match the even spacing between adjacent fibers across the width of the optical fiber ribbon. If the laser diode and the photodiode are mounted adjacently, then the light from the laser enters the adjacent photodiode as a result of reflection or the like, and crosstalk may arise. In a four channel transceiver the array of four transmitter diodes and the array of four receiver diodes are separated by a gap and for this reason the individual diodes cannot be aligned with the eight more closely spaced fibers ends of an 8-fiber optical ribbon termination. It is possible to provide two separate 4-fiber ribbons each with its own 4-fiber connector aligned with one of the 4-diode arrays, one ribbon for connecting the 4-diode transmitter array of one transceiver to the 4-diode receiver array of the opposite transceiver; and another ribbon for connecting the 4-diode receiver array of the one transceiver to the 4-diode transmitter array of the opposite transceiver. However, this solution requires four ribbon terminations on the two separate ribbons. It is more desirable both from a viewpoint of economics as well as simplicity of construction and maintenance to provide a single 8-fiber ribbon for interconnecting two 4-channel transceivers. The temperature of heat resistance of the fiber ribbon is about 100° C. If a high temperature treatment such as the solder reflow for the module is applied, the ribbon may be damaged.

SUMMARY OF THE INVENTION

This invention provides three alternative interconnections between 4-channel opto-electronic transmitter-receivers, making it possible to use a single 8-fiber ribbon or a 12-fiber ribbon for interconnecting two 4-channel transceivers having separate, spaced apart transmitter and receiver diode arrays.

This invention also makes it possible to manufacture an optical interface (including a module) in which the crosstalk scarcely occurs and a high temperature treatment can be performed.

This invention provides three alternative interconnections between 4-channel opto-electronic transmitter-receivers, two of which make possible the use of a single 8-fiber ribbon for interconnecting two 4-channel transceivers having separate, spaced aparttransmitter and receiver diode arrays.

More particularly, the invention in a first one of its embodiments is an optical interface for a 4-channel opto-electronic transmitter-receiver module, the module having a module housing including at least one housing wall, an opening in the housing wall, a transmitter chip comprising a 4-element, i.e. 4-diode, laser diode array and a receiver chip comprising a 4-element, or 4-diode, photodetector array, the transmitter chip and the receiver chip being mounted in the wall opening. The optical interface has an optical adapter comprising a bent fiber optical head having an optical head body with a proximal face and a distal face, eight optical fibers extending through the head body, each of the fibers having a fiber end on each face, the fiber ends on the proximal face being grouped in two fiber end arrays each comprising four fiber ends evenly spaced from each other, the fiber end arrays being spaced apart from each other by a distance greater than the spacing between adjacent fibers in the arrays, the fiber ends on the distal face being evenly spaced from each other in a single array of eight fiber ends, the head body being secured to the module housing with the proximal face towards the housing wall and with the fiber end arrays in optical alignment with a corresponding one of the 4-diode laser diode array and the 4-diode photodetector array. As a result, an 8-fiber optical ribbon connector such as an optical fiber connector terminating an optical fiber transmission ribbon of eight evenly spaced fibers can be mechanically coupled and optically interfaced to the single array of eight fiber ends on the distal face of the optical head body for optical communication of the transmitter-receiver module via the optical fiber transmission ribbon. It is desirable that the optical head body be configured for supporting each of the eight optical fibers with a minimum radius of curvature between the distal and the proximal faces no lesser than recommended by the manufacturer of the optical fibers.

Four of the optical fibers extending through the optical head body comprise a transmitter fiber group and the other four of the optical fibers extending through the optical head body comprise a receiver fiber group, the fibers in the transmitter group being single mode optical fibers, the fibers in the receiver group being multimode optical fibers, whereby coupling losses between the fibers of the receiver fiber group and the fibers of a single mode fiber transmission ribbon are reduced and alignment of the receiver diode array to the bent fiber optical head is facilitated.

In a second one of its embodiments the invention is an optical interface which includes a straight fiber optical head and an adapter cable. The straight fiber optical head has a head body having a proximal face and a distal face, eight optical fibers extending through the head body, each of the fibers having a fiber end on each face, the fiber ends on each of the proximal face and the distal face being grouped in two fiber end arrays, each array comprising four fiber ends evenly spaced from each other, the fiber end arrays being spaced apart from each other by a distance greater than the spacing between adjacent fibers in the arrays. The optical head body is secured to the module housing with the proximal face towards the housing wall and with each of the fiber end arrays in optical alignment with a corresponding one of the 4-diode laser diode array and the 4-diode photodetector array. The adapter cable has a 12-fiber optical ribbon proximal connector, an 8-fiber optical ribbon distal connector, and an 8-fiber adapter ribbon between the proximal and the distal connectors, the ribbon being divided at one end thereof into two 4-fiber widths, each of the widths being terminated at an outer four of twelve fiber terminations of the proximal connector, the 12-fiber proximal connector being optically and mechanically mateable to the straight fiber optical head for optically interfacing each of the two 4-fiber widths to a corresponding one of the fiber end arrays of the optical head, and an opposite end of the adapter ribbon being terminated by the 8-fiber optical ribbon distal connector; whereby the 8-fiber distal connector can be mated to another 8-fiber optical fiber connector terminating an 8-fiber optical fiber transmission ribbon so as to interface the transceiver module for optical communication via the optical fiber transmission ribbon. The eight straight optical fibers extending through the head body may be mutually parallel between the proximal and the distal faces.

The four of the eight optical fibers extending through the optical head body comprise a transmitter fiber group and the other four of the eight optical fibers extending through the optical head body comprise a receiver fiber group, the fibers in the transmitter group being single mode optical fibers, the fibers in the receiver group being multimode optical fibers, and all eight fibers in the adapter cable being single mode optical fibers, whereby coupling losses between the fibers of the adapter cable and the fibers of the receiver fiber group of the optical head are reduced and alignment of the receiver diode array to the bent fiber optical head is facilitated.

In a third one of its embodiments the invention is an optical interface which includes a straight fiber optical head as described in connection with the second embodiment. However, in lieu of the adapter cable, a 12-fiber optical transmission ribbon is terminated at each of its opposite ends with a 12-fiber optical connector, and one 12-fiber optical connector is optically coupled to the two 4-fiber end arrays on the distal face of the optical head, such that four optical fibers of the 12-fiber transmission ribbon remain unused.

The invention may be also summarized in more general form as an optical interface for a 4-channel opto-electronic transmitter-receiver module, the module having a module housing including at least one housing wall, an opening in the housing wall, a transmitter chip comprising a 4-diode laser diode array and a receiver chip comprising a 4-diode photodetector array, the transmitter chip and the receiver chip mounted in the wall opening, an adapter unit having eight optical fibers each with a proximal fiber end and an opposite fiber end, the proximal fiber ends being grouped in two fiber end arrays each comprising four fiber ends evenly spaced from each other, the fiber end arrays being spaced apart from each other by a distance greater than the spacing between adjacent fibers in the arrays, each of the fiber end arrays being supported in optical alignment with a corresponding one of the 4-diode laser diode array and the 4-diode photodetector array, the opposite fiber ends being evenly spaced from each other in a single array of eight fiber ends adapted for interfacing with an 8-fiber optical fiber connector terminating an optical fiber transmission ribbon of eight evenly spaced fibers for optical communication of said transmitter-receiver module via the optical fiber ribbon.

The general summary of the preceding paragraph covers the two more specific forms of the invention earlier summarized as the first embodiment and the second embodiment in earlier paragraphs.

In the first embodiment the adapter unit includes an optical head body having a proximal face and a distal face, the eight optical fibers extending through the head body, each of the fibers having a fiber end on each face, the proximal fiber ends being on the proximal face, the opposite fiber ends being on the distal face, the optical head body being secured to the module housing with the proximal face towards the housing wall for supporting the fiber end arrays in the optical alignment with a corresponding one of the 4-diode laser diode array and the 4-diode photodetector array.

In the second embodiment the adapter unit includes an optical head having a head body with a proximal face and a distal face, the eight optical fibers extending straight through the head body, the fibers having the proximal fiber ends on the proximal face and distal fiber ends on the distal face, the proximal fiber ends and the distal fiber ends being grouped in two fiber end arrays, each array comprising four fiber ends evenly spaced from each other, the fiber end arrays on each face being spaced apart from each other by a distance greater than the spacing between adjacent fibers in the arrays, the optical head body secured to the module housing with the proximal face towards the housing wall and with each of the fiber end arrays on the proximal face in optical alignment with a corresponding one of the 4-diode laser diode array and the 4-diode photodetector array; and an adapter cable comprising a 12-fiber optical fiber proximal connector, an 8-fiber optical fiber distal connector, an 8-fiber ribbon between the proximal and the distal connector, the ribbon being divided at one end thereof into two 4-fiber widths, each of the widths being terminated at an outer four of twelve fiber terminations of the proximal connector, the 12-fiber optical fiber proximal connector being mateable to the optical fiber receptacle for optically interfacing each of the two 4-fiber widths to a corresponding one of the fiber end arrays of the optical head, the opposite fiber ends being at an opposite end of the ribbon and terminated at the 8-fiber optical fiber distal connector for interfacing to a transmission ribbon.

In a third embodiment of the invention the transceiver modules is equipped with a straight fiber optical head body as in the second embodiment. However, in lieu of an adapter cable a 12-fiber optical transmission ribbon is terminated at each of its opposite ends with a 12-fiber optical connector, one of the 12-fiber optical connectors being optically coupled to the two fiber end arrays on the rear, exposed face of the optical head body, such that four optical fibers of said transmission ribbon remain unused.

In the second or third embodiment described above, the optical head may have a guide hole for positioning the optical fiber connector. Accordingly, the optical fiber connector such as an optical fiber connector of the MPO type can be directly attached and detached.

In a fourth one of its embodiments, the invention is an optical interface which includes a straight fiber optical head as described in the second or third embodiment. However, an optical head has a heat sink and a block of crystallized glass. For example, a plurality of v-grooves are formed in the block made of crystallized glass. Optical fibers are arranged along the plurality of v-grooves, respectively. An optical fiber array is constructed by the plurality of optical fibers. Each of the laser diode array and the photodetector array is mounted in a sub-mount having the heat sink for releasing the heat generated by operation.

In the fourth embodiment, in lieu of the adapter cable, a 12-fiber optical transmission ribbon is used. Twelve optical fibers of the optical transmission ribbon are terminated with one end of a 12-fiber optical connector, and the other end of the 12-fiber optical connector is optically coupled to the fiber end array of the optical fiber array on the distal face on which the surface of the optical head body is exposed.

When the optical fiber array is constructed by eight optical fibers, eight optical fibers (each four optical fibers on both sides) of the twelve optical fibers of the 12-fiber optical connector are optically coupled to the fiber end array of the optical fiber array. In this case, the central four optical fibers of the twelve optical fibers are not used.

When the optical fiber array is constructed by twelve optical fibers, eight optical fibers (each four optical fibers on both sides) of the twelve optical fibers of the 12-fiber optical connector are optically coupled to the fiber end array for four fibers on both sides of the optical fiber array. Also in this case, the central four optical fibers of the twelve optical fibers are not used.

These and other improvements, features and advantages of this invention will be better understood by reference to the following detailed description of the invention taken in conjunction with the accompanying drawings.

DETAILED DESCRIPTION OF THE PREFERRED EMBODIMENTS

Figure 1:
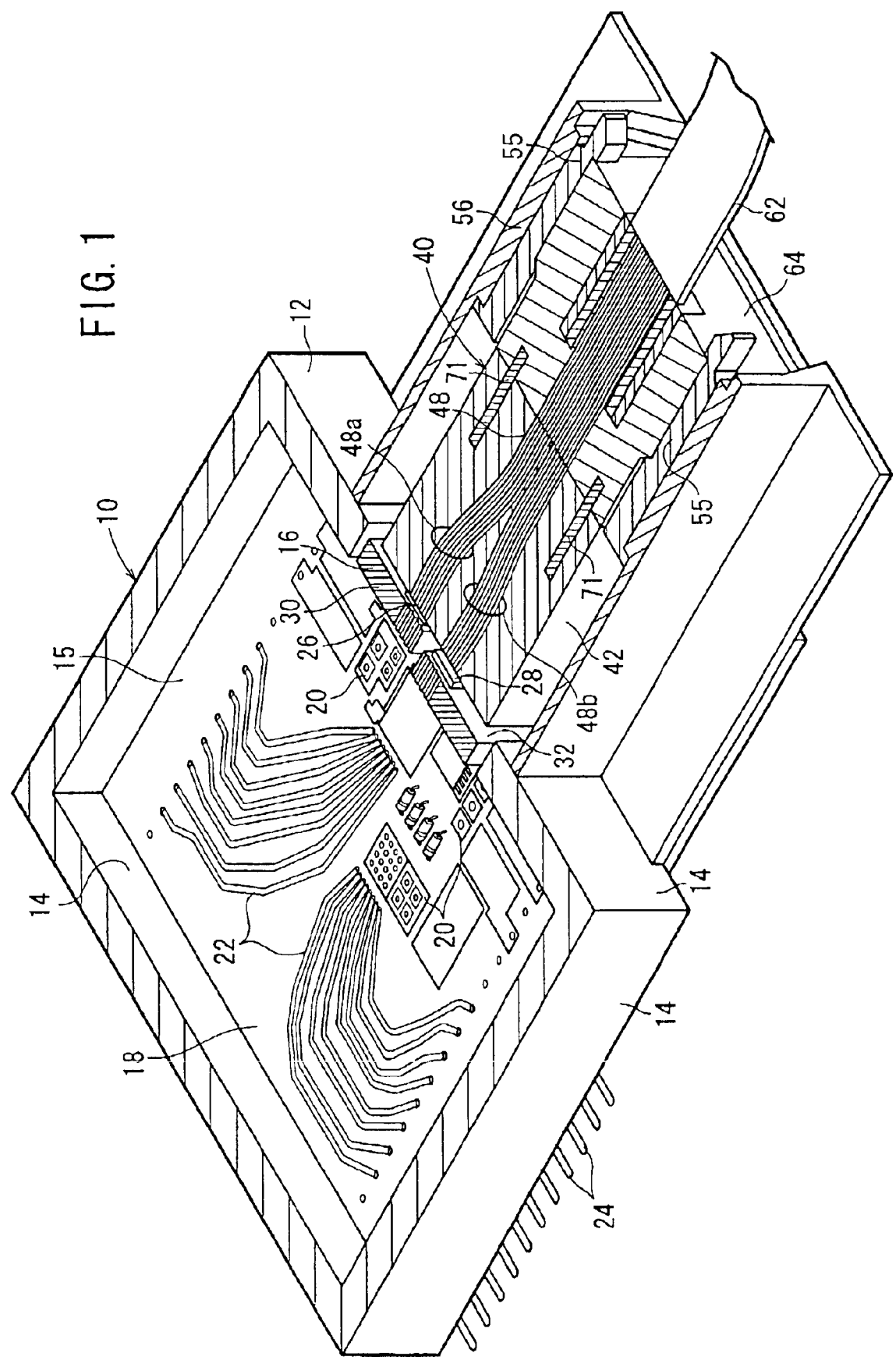
FIG. 1 is a top perspective view of a typical 4-channel fiberoptic transceiver module equipped with the optical interface in its first embodiment, shown coupled to an eight fiber optical ribbonconnector, the bent fiber optical head and the optical fiber connector being shown in section along the plane of the optical fibers.

With reference to the accompanying drawings wherein like elements are designated by like numerals, FIG. 1 shows a 4-channel opto-electronic transceiver module generally designated by numeral 10. The module 10 includes a module housing 12 with four housing walls 14 including a wall 14 apertured by wall opening 16. A top surface 15 of substrate 18 in the housing supports a number of electronic integrated circuit (IC) chips 20 connected by means of printed circuit conductors 22 to external leads 24. The transceiver module also includes a transmitter chip 26 comprising a 4-diode laser diode array and a receiver chip 28 comprising a 4-diode photodetector array. The leads 24 will normally be connected to an electronic system or subsystem which communicate with another electronic system or subsystem through a 4-channel optical fiber communications system including two 4-channel transceiver modules 10 interconnected by an optical fiber transmission cable, as will be explained in greater detail below.

The transmitter chip 26 and the receiver chip 28 are mounted in the wall opening 16 facing the exterior of the module housing 12. IC chips 20 include driver circuits which deliver electrical drive currents to the 4-diode laser diode array of the transmitter chip 26 thereby causing the diodes to emit light pulses which carry in optical form the information delivered by the electrical drive currents, thereby converting electronic signals for transmission in optical form via optical fibers, as will be described below. The four photodetector diodes of receiver chip 28 are each illuminated by a corresponding optical fiber and convert the optical signals carried by the optical fibers into electrical signals which are amplified and further processed by corresponding electronic circuits on IC chips 20. The package leads 24 accept electrical input signals for optical transmission by the module 10 and deliver electrical output signals corresponding to optical signals received by the module 10.

It will be seen in FIG. 1 that the transmitter chip 26 is mounted on a transmitter substrate 30 while the receiver chip 28 is mounted on a separate receiver substrate 32. The 4-diode photodetector array of the receiver chip and the 4-diode laser array of the transmitter chip are linear arrays arranged along a common line parallel to the top surface 15 of the substrate 18. The diodes in each array are evenly spaced in relation to each other, and the diode spacing is the same in each array, to match the even spacing between the centers of adjacent optical fibers in standard commercial optical fiber ribbon terminations. However, the photodetector and laser diodes adjacent to each other at the inner ends of the two arrays are spaced from each other by a distance greater than the spacing of the diodes in each of the arrays and also greater than the spacing between the centers of adjacent optical fiber ends in the fiber ribbon terminations. This is because as a practical matter, the diodes on each of the receiver and transmitter substrates cannot be placed at the very edge of the substrates in order to achieve the same close spacing as between the adjacent diodes in each of the two arrays, and because the two different types of laser and photodetector diodes cannot be manufactured on one common substrate either. The result is that some form of optical interface is needed to transition from the wider 4+4 spacing of the two diode arrays of module 10 to the even fiber end spacing of an 8-fiber optical ribbon termination.

Figure 4:
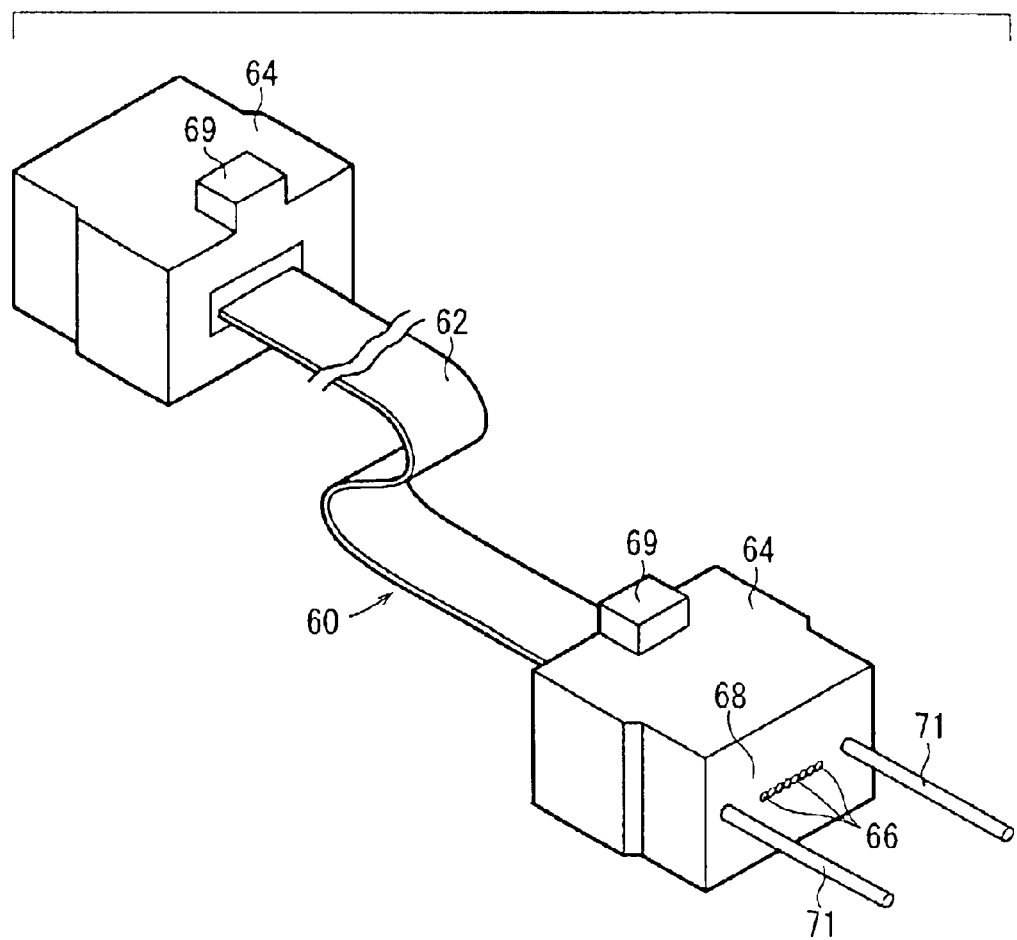
FIG. 4 is a perspective view of an 8-fiber transmission cable consisting of an 8-fiber transmission ribbon terminated at each end with an 8-fiber connector, showing the special keying of the two connectors.
Figure 5:
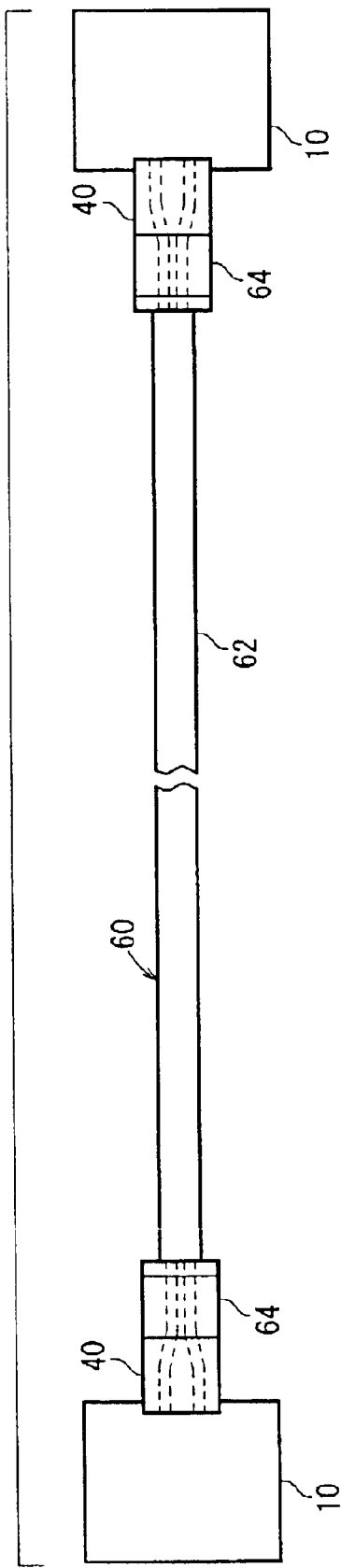
FIG. 5 is a top plan view of a 4-channel optical fiber communications system including two 4-channel transceiver modules interconnected by an 8-fiber transmission cable such as shown in FIG. 4, each module interfaced to the transmission cable by a bent fiber optical head according to the first embodiment of this invention.
Figure 6:
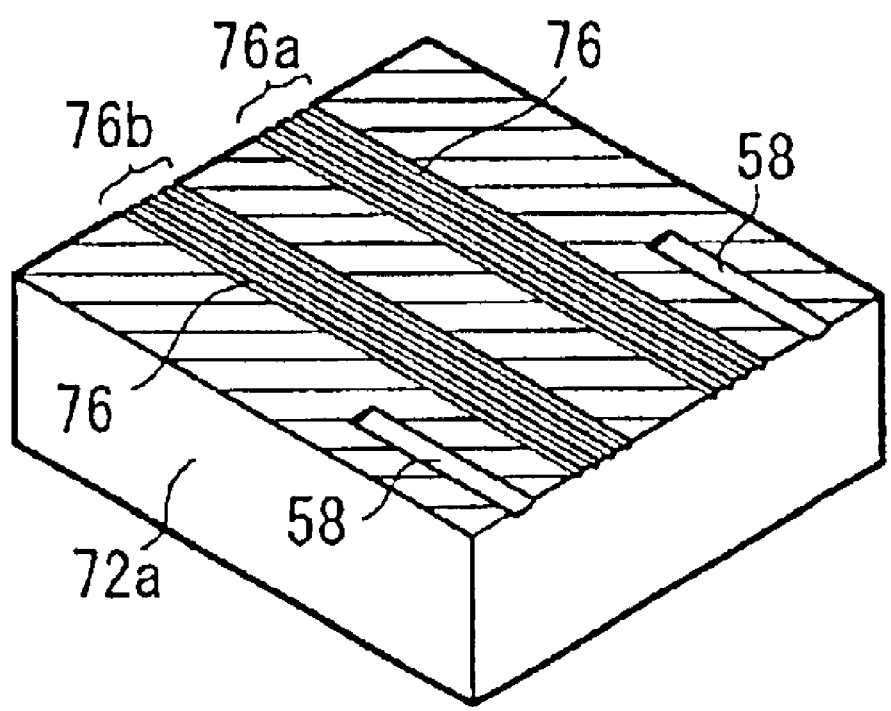
FIG. 6 is a perspective view of the straight fiber optical head according to the second embodiment of this invention.
Figure 7:
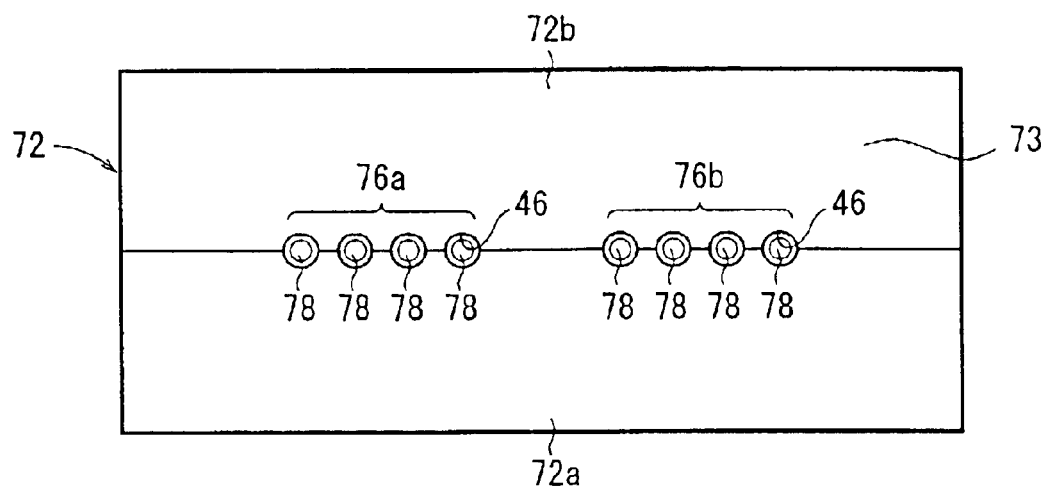
FIG. 7 is an end view of the head body of FIG. 6.
Figure 8:
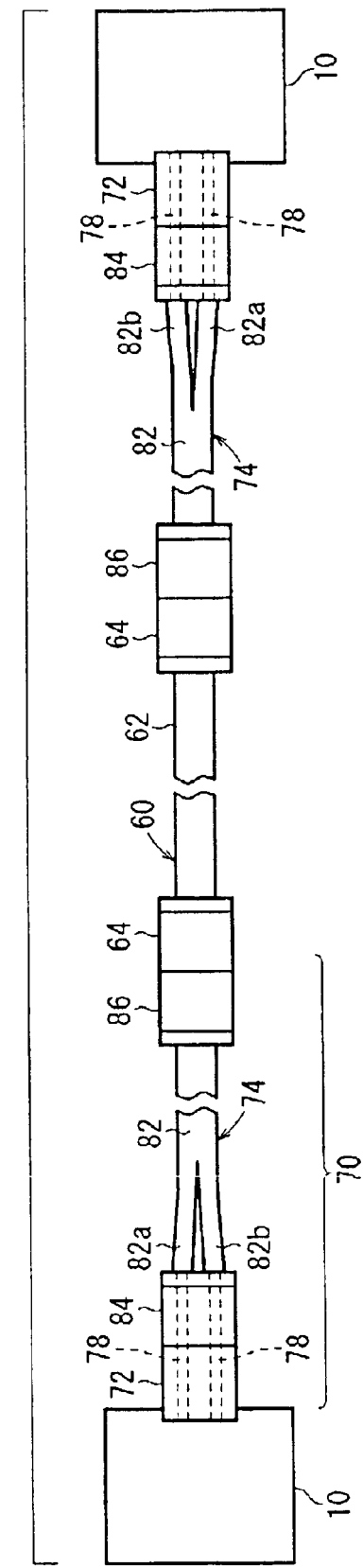
FIG. 8 is a top plan view of a 4-channel optical fiber communications system including two 4-channel transceiver modules interconnected by an 8-fiber transmission cable such as shown in FIG. 4, each module interfaced to the transmission cable by an adapter cable and a straight fiber head body according to the second embodiment of this invention.

Two alternate forms or embodiments of the optical interface according to this invention are described herein. The first embodiment is illustrated in FIGS. 1, 2, 3 and 5. FIGS. 6, 7 and 8 relate to the second embodiment. FIG. 4 shows a transmission cable which is used in both embodiments.

Figure 2:
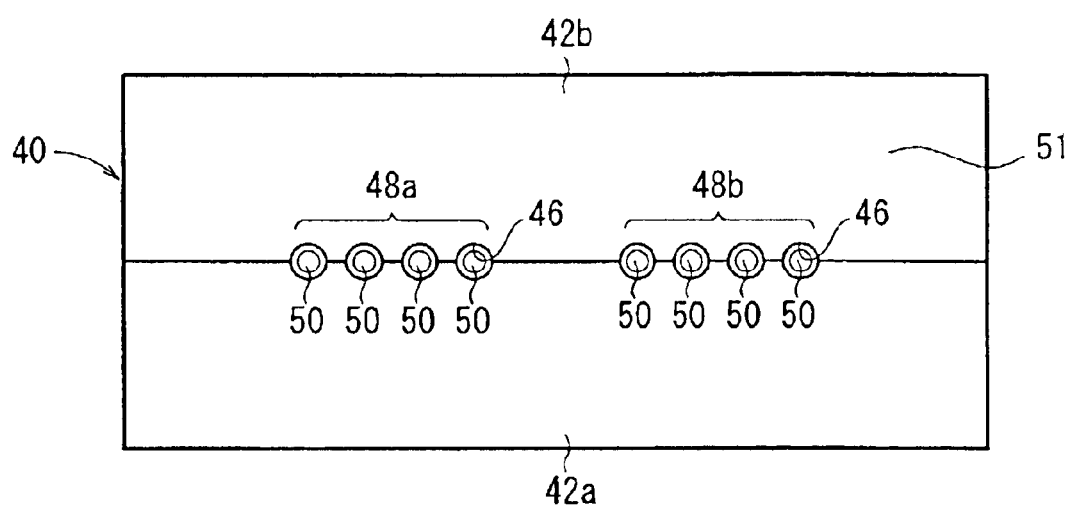
FIG. 2 is an end view of the proximal face of the bent fiber optical head body in FIG. 1.
Figure 3:
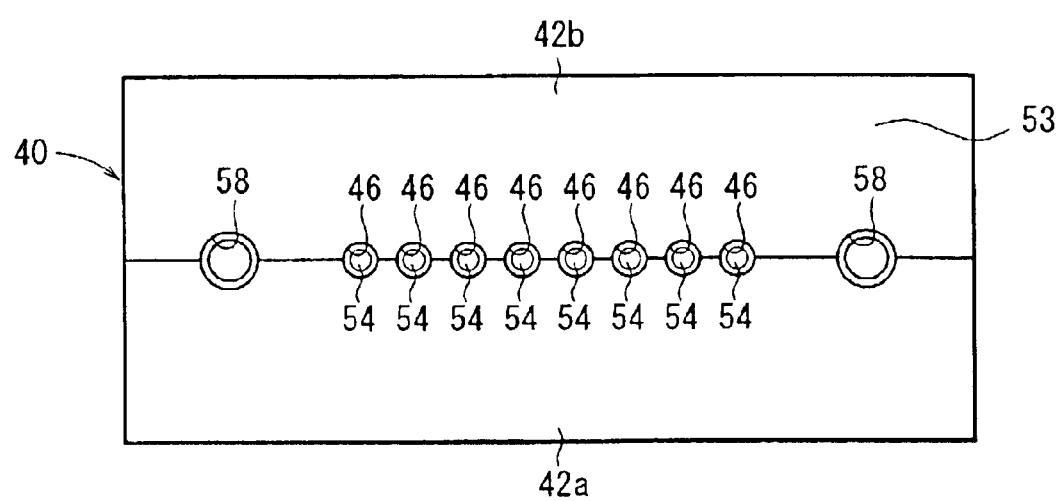
FIG. 3 is an end view of the distal face of the bent optical head body in FIG. 1.

Turning to FIGS. 1, 2 and 3 the optical interface in its first embodiment includes an optical head body 40 which is a rectangular block comprised of an lower half 42a and an upper half 42b. Between the two halves are contained eight optical fiber segments 48 in fiber channels 46. The two halves may be ceramic substrates fully metal plated on all their exterior surfaces. The channels may be v-grooves defined on one substrate and covered by a plane interior surface of the other substrate. The diode elements on photodiode receiver chip 28 and laser diode transmitter chip 26 are optically aligned to the fiber ends of the head body 40 and the chips 26, 28 are fixed to the head body 40 with resin (adhesive or the like). When the optical head body 40 and the optical element array (laser diode array and photodetector array) are formed on the heat sink, for example, it is preferable to perform spot welding by laser. The assembly comprising the head body 40 and the diode array chips 26, 28 form an optical head assembly which is mounted to the transceiver housing 12 with resin (for example, adhesive) on the proximal surface 51 to the apertured wall 14 of the housing such that the chips 26, 28 are supported through the wall opening 16 within the housing where the diode array chips are electrically interconnected to other appropriate electronic transmitter and receiver circuits. When the optical head body 40 is formed of, for example, crystallized glass which is resistant to high temperature, the optical head body 40 can be soldered to the transceiver housing. In this case, when the optical head body 40 is mounted so that the housing 12 is lidded therewith, it is possible to provide an air-tight enclosed structure of the housing 12. The optical head is also contained in a fiber ribbon connector receptacle 56 fastened to the module housing 12. The purpose of receptacle 56 is to receive and mechanically retain an optical ribbon connector in optical coupling with the fiber ends on the rear or distal surface of the optical head. The optical head body has a proximal surface 51 seen in FIG. 2 which faces the wall opening 16 and each fiber segment 48 has a proximal fiber end 50 on the proximal surface 51 aligned in facing relationship with a corresponding diode on one of the two diode arrays on transmitter chip 26 and receiver chip 28. The proximal fiber ends are grouped in two fiber end arrays 48a, 48b of four fiber ends each. For example, if the proximal fiber end 50 is slightly separated from each of the opposed diodes, crosstalk may occur, in which the light from the laser diode array enters the photodetector array. However, when the proximal fiber ends are grouped in the two fiber end arrays 48a, 48b, and the laser diode array and the photodetector array are mounted to be aligned in facing relationship with the fiber end arrays 48a, 48b as described above, then it is possible to increase the spacing between the laser diode array and the photodetector array as compared with the arrangement pitch of the optical fibers, and it is possible to avoid the crosstalk. One fiber end array 48a is in optical alignment with the 4-channel transmitter chip 26 while the other fiber end array 48b is in optical alignment with the 4-channel receiver chip 28. The optical head also has an opposite or distal face 53 seen in FIG. 3 which faces away from the module housing and on which are arranged the distal fiber ends 54 of fiber segments in a linear array with even center to center spacing of the individual fiber ends 54 such as to match the center to center spacing of the individual fibers of a standard 8 fiber ribbon optical fiber termination. As seen in FIG. 1 the individual fiber segments 48 of the optical head 40 are bent internally to the head body along their length so as to converge from a wider spacing on the proximal face 51 to a closer fiber spacing on the distal face 53, and thereby provide the transition from the spaced apart diode arrays of the transceiver module 10 to the close and regular fiber spacing of standard optical fiber ribbon terminations. The bend curvature or radius of the fiber segments 48 between the proximal and distal fiber ends is no smaller than recommended by the fiber manufacturer to avoid degradation of optical signal transmission through the fiber segments. The upper and lower halves 42a, 42b of the optical head are secured together as by soldering or may be molded so as to contain and enclose the fiber segments.

The transceiver module is connected to an optical fiber transmission cable such as shown in FIG. 4 and generally designated by numeral 60. The cable 60 has a transmission ribbon 62 which is a commercially available standard 8-fiber ribbon terminated at each of its opposite ends with an industry standard 8-fiber optical ribbon connector 64. The evenly spaced ends 66 of the eight fibers are arranged in a linear array 68, and each connector has a pair of connector pins 71 which mate into corresponding pin holes 58 of optical head 40 as shown in FIG. 1 to precisely position and optically align the fiber end array 68 of the transmission cable 60 with the array of distal fiber ends 54 on the distal face 53 of the optical head. An optical fiber connector 64 is retained in optical fiber receptacle 56 by retainer arms 55 of the receptacle to hold the optical fiber connector 64 in optical coupling with the optical head 40. The optical fiber connector 64 at the opposite end of transmission ribbon 62, not seen in FIG. 1, is similarly coupled to a second transceiver module 10 also equipped with an optical head 40 arrangement similar to that shown in FIG. 1. The interconnection of two transceiver modules optically interfaced in this fashion to an optical ribbon transmission cable 60 is illustrated in FIG. 5. As shown in FIG. 4 the connectors 64 have key tabs 69 which limit the orientation of the connector when inserted in connector receptacle 56, in that the connector can only be mated to the receptacle with the key tab point upwards in FIG. 1. In conventional ribbon cables the connectors at opposite ends of the optical ribbon have the key tabs pointing in opposite directions, thereby to force a 180 degree twist along the length of the ribbon so as to preserve same channel numbering on the transmitter and receiver sides. When connecting two identical transceiver modules 10, however a "straight" ribbon cable is needed to guarantee that the transmit side of one be connected to the receive side of the other module.

The optical head body 40 with bent optical fiber segments is, as a practical matter, challenging to manufacture economically on a commercial scale. For this reason, an alternate embodiment of this invention has been devised which is more readily assembled with commercially available components.

Turning to FIGS. 6, 7 and 8 the second embodiment of the invention will be described. The second embodiment of the optical interface includes a transition adapter 70 made up of two assemblies: an optical head body 72 and an adapter cable 74. The head body as shown in FIG. 7 is comprised of a top and bottom substrate 72a, 72b similarly to the previously described head body 40 of the first embodiment. The head body 72 has a proximal face and a distal face and contains eight straight optical fibers 76 extending between the two faces, each fiber having a fiber end 78 on each face as shown in FIG. 7. The eight fibers 76 are mutually parallel but are grouped into two spaced apart fiber groups 76a, 76b of four evenly spaced fibers 76 each. The fiber ends 78 of the eight fibers are grouped into two fiber end arrays 76a', 76b' of 4 fiber ends each, both fiber end arrays extending along a common line on each face of the head body 72 but spaced from each other by a distance greater than the spacing between individual adjacent fibers 76 in each of the arrays. The spacing between the two fiber groups 76a, 76b matches the spacing between the receiver and transmitter diode arrays. The head body 72 is assembled to the receiver and transmitter chips 26, 28 as described in connection with head body 40 of the first embodiment to form an optical head assembly, to hold the head body 72 to the module housing with each fiber end array 76a' and 76b' on the proximal face 73 of the head body in optical alignment with the 4-diode transmitter and receiver diode arrays on transmitter chip 26 and receiver chip 28, respectively. The head body 72 has an opposite or rear face (not shown in the drawings) which is similar to the proximal face 73 shown in FIG. 7. The head body 72 is contained in an optical fiber connector receptacle, such as receptacle 56 in FIG. 1.

The adapter cable 74 consists of a length 82 of commercially available eight fiber optical ribbon which is divided at one end into two 4-fiber widths 82a, 82b. Each 4-fiber width is terminated at a corresponding set of outer four fiber positions of a conventional industry standard 12-fiber optical fiber connector 84, leaving empty the middle four fiber positions of connector 84. The spacing between the two groups of fiber ends on the connector 84 matches the spacing between the fiber end arrays 76a', 76b' on head body 72. The 12-fiber connector 84 is optically coupled to the rear face of the head body, the face opposite to proximal face 73 and facing away from module 10, by inserting the connector into retentive engagement with the optical fiber receptacle mentioned in the preceding paragraph. When so coupled the fiber ends on optical fiber connector 84 are optically aligned with the fiber ends 78 of the two subarrays of fiber ends 78 of the head body 72 on the outward or rear face of the head body. The opposite end of ribbon 82 is terminated with a standard 8-fiber optical fiber connector 86 which has distal fiber ends of the ribbon 82 and which mechanically and optically couples with an end connector 64 of transmission ribbon 62 of cable 60, so as to interface the transmitter-receiver module 10 for optical communication via the optical fiber ribbon 62. Two transceiver modules 10 are each optically interfaced in this manner for two-way communication with each other in FIG. 8.

The optical interface 70 has a greater number of optical connections than interface of the first embodiment described in connection with FIGS. 1 and 5. This introduces greater coupling losses in the transmission of light signals through the interface 70, a tradeoff for the lower cost and easier manufacture of the latter.

Coupling losses in both embodiments of the optical interface are reduced by substituting multi-mode optical fibers for single mode optical fibers in the receiving subgroup of fibers of optical head 40 and also in head body 72. The receiving group of fibers in the first embodiment described above is fiber group 48b in FIG. 1, while the receiving group of fibers in the second embodiment is fiber group 76b in FIGS. 6 and 7. Likewise, the multimode fibers also reduce coupling losses of light signals received from the transmission cable 60 at the coupling with the distal fiber ends 54 of optical head 40, and coupling losses of signals received from the adapter cable 74 into fiber group 76b of head body 72.

Figure 9:
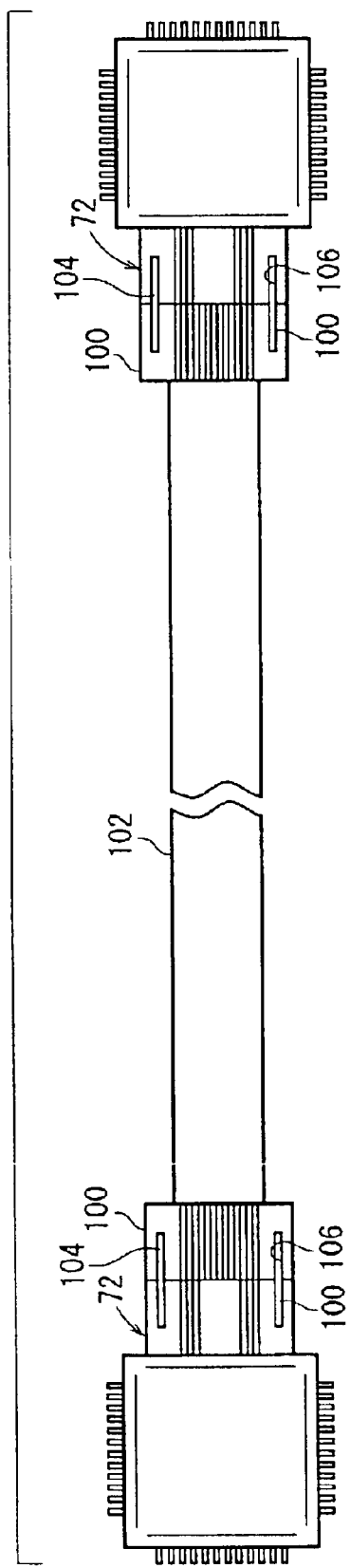
FIG. 9 is a plan view illustrating a third embodiment of the optical interface of this invention.

In a third embodiment of the optical interface of this invention, as shown in FIG. 9, an optical head includes a head body 72 as just described, but does not make use of an adapter cable 70 (see FIG. 8). Instead, a 12-fiber optical transmission ribbon 102 is used which is terminated at each of its opposite ends with a conventional 12-fiber optical connector 100. The 12-fiber optical connector 100 is optically coupled to the two fiber end arrays on the distal face of the optical head body 72, such that each of the two fiber end arrays is optically coupled to an outer four fibers of the 12-fiber ribbon and the middle four optical fibers of the transmission ribbon remain unused.

Alternatively, guide holes 106 into which guide pins 104 for the 12-fiber optical connector 100 are inserted are provided on the distal face of the optical head body 72. That is, the optical head body 72 has a receptacle structure in which the optical connector such as an optical fiber connector of the MPO type can be directly attached and detached.

Therefore, in the case of this optical head, the optical connector 100 can be fixed to the head body 72 with ease only by inserting the connector portion of the optical connector 100 without using any clamper such as a plate spring. Further, the optical connector 100 can be detached from the head body 72 with ease by separating the connector portion.

Figure 10:
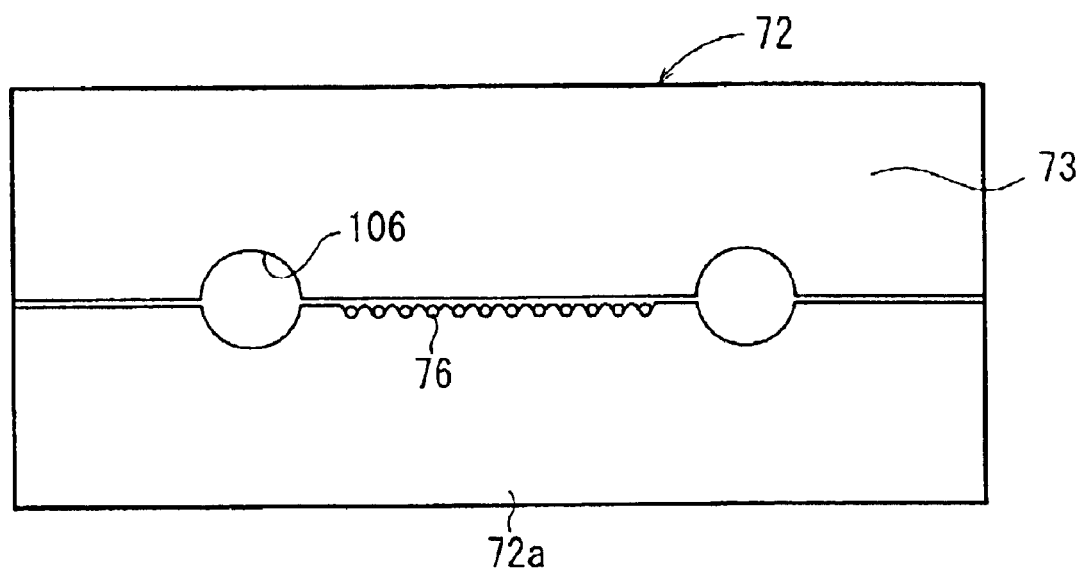
FIG. 10 is a sectional view illustrating another arrangement of an optical head of the third embodiment of the optical interface of this invention.

Alternatively, as shown in FIG. 10, another form is also available, in which the head body 72 has twelve optical fibers 76, and four channels on both ends each are used. When a conventional or commercially available 12-channel fiber ribbon is used, the 12-channel optical head is easily assembled and inexpensive. Therefore, such an arrangement does not result in increase in cost. In this case, the central four channels are not used.

Next, an optical head according to a fourth embodiment of the optical interface of this invention will be explained with reference to FIG. 11.

Figure 11:
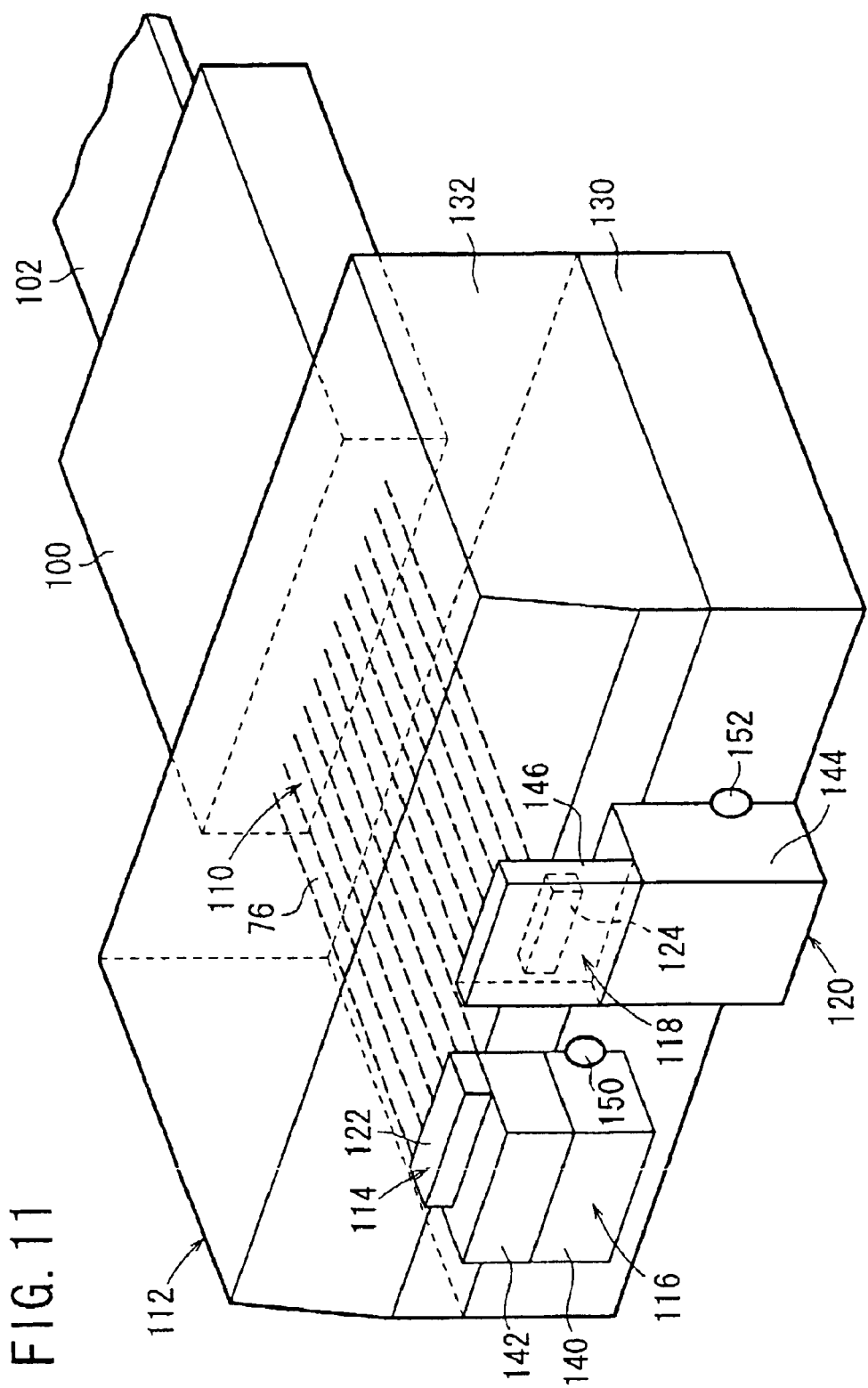
FIG. 11 is a perspective view illustrating an arrangement of an optical head of a fourth embodiment of the optical interface of this invention.

As shown in FIG. 11, the optical head according to the fourth embodiment may comprise an optical fiber block 112 which has an optical fiber array 110 including a plurality of (for example, eight) optical fibers 76 aligned therein, a laser diode block 116 which has a laser diode array 114, and a photodetector block 120 which has a photodetector array 118.

The laser diode array 114 includes four laser diodes which are aligned on a first semiconductor substrate 122. The photodetector array 118 includes four light-receiving elements which are aligned on a second semiconductor substrate 124.

The optical fiber block 112 has a lower block section 130 which is composed of a heat sink member, and it has an upper block section 132 which is composed of crystallized glass. The upper block section 132 comprises two members (first and second members) which are stuck to one another. A plurality of (for example, twelve) unillustrated v-grooves are formed on the upper surface of the first member disposed at the lower position in order to retain the plurality of optical fibers 76 in parallel to one another. The lower surface (surface opposed to the v-grooves of the first member) of the second member disposed at the upper position is a flat surface.

The optical fibers 76 are arranged in the twelve v-grooves respectively, the first and second members are stuck to one another, for example, with adhesive, and the twelve optical fibers 76 are retained and fixed in the v-grooves. Thus, the optical fiber array 110, in which the twelve optical fibers 76 are aligned in parallel to one another, is constructed. The upper block section 132 and the lower block section 130 are also stuck to one another, for example, with adhesive. An optical fiber ribbon 102 is coupled via an optical connector 100 to the back surface of the optical fiber block 112 (surface disposed on the side opposite to the front surface on which the laser diode block 116 and the photodetector block 120 are stuck).

The laser diode block 116 has a lower block section 140 which is composed of a heat sink member, and it has an upper block section 142 which is composed of, for example, an aluminum nitride substrate (AlN substrate). The laser diode array 114 is secured to the upper surface of the upper block section 140, for example, with adhesive.

The photodetector block 120 has a lower block section 144 which is composed of a heat sink member, and it has an upper block section 146 which is composed of, for example, an AlN substrate. The photodetector array 118 is secured to the side surface of the upper block section 142, for example, with adhesive.

As shown in FIG. 11, the laser diode block 116 and the photodetector block 120 are stuck to the front surface of the optical fiber block 112, for example, with adhesive. Further, the lower block section 130 of the optical fiber block 112 and the lower block section 140 of the laser diode block 116 are subjected to spot welding (welding point 150), for example, with YAG laser. Further, the lower block section 130 of the optical fiber block 112 and the lower block section 144 of the photodetector block 120 are subjected to spot welding (welding point 152). Thus, the optical head is constructed.

In this arrangement, the optical fiber ribbon 102 which is coupled via the optical connector 100 is a 12-fiber ribbon in which twelve optical fibers are aligned. The twelve v-grooves are formed in the upper block section 132 of the optical fiber block 112. The optical fibers 76 are aligned in the v-grooves respectively.

Respective first ends of the twelve optical fibers aligned in the upper block section 132 are optically coupled to the respective optical fibers of the 12-fiber ribbon 102 via the optical connector 100 on the back surface of the optical fiber block 112.

Further, for example, the four fiber ends of the respective second ends of the twelve optical fibers 76 aligned in the upper block section 132 which are arranged on the left are opposed to the four laser diodes of the laser diode block 116. The four fiber ends which are arranged on the right are opposed to the four light-receiving elements of the photodetector block 120. The central four fibers of the twelve optical fibers 76 aligned in the upper block section 132 are not used.

In this arrangement, the optical fiber block 112 is made of crystallized glass which can endure high temperature. Therefore, the optical fiber block 112 can be attached to the transceiver housing 12, for example, by soldering the lower block section 130 to the transceiver housing 12 shown in FIG. 1. In this case, the optical fiber block 112 is attached to the transceiver housing 12 so that the opening of the transceiver housing 12 is lidded with the optical fiber block 112. Thus, it is possible to provide the air-tight enclosed structure of the transceiver housing 12.

The laser diode block 116 and the light-receiving element block 120 can be mounted separately. Therefore, the spacing between the laser diode array 114 and the photodetector array 118 can be made larger than the arrangement pitch of the optical fibers 76. Thus, it is possible to avoid the crosstalk.

The welding points 150, 152 can be provided when the spot welding is performed, because the laser diode block 116 and the photodetector block 120 are mounted separately. Especially, in the case of the structure shown in FIG. 11, the size of the lower block section 140 of the laser diode block 116 is different from the size of the lower block section 144 of the photodetector block 120. A stepped positional relationship is adopted, for example, for the lower end position of the lower block section 140 of the laser diode block 116 and the lower end position of the lower block section 144 of the photodetector block 120. Such a positional relationship makes it possible to sufficiently provide the welding points 150, 152.

In the optical head according to the fourth embodiment described above, the twelve optical fibers 76 are arranged to construct the optical fiber array 110. Alternatively, the optical fiber array 110 may be constructed by arranging eight optical fibers. In this case, the eight optical fibers are grouped into four optical fibers, and the two groups are separated from each other. The four optical fibers of the first group are opposed to the laser diode array 114. The four optical fibers of the second group are opposed to the photodetector array 118.

Further, the fiber end array of the first group of the optical fiber array 110 is optically coupled, for example, to the four optical fibers on the left of the optical connector 100. The fiber end array of the second group is optically coupled to the four optical fibers on the right of the optical connector 100. Therefore, also in this case, the central four optical fibers of the twelve optical fibers of the 12-fiber ribbon 102 connected to the optical connector 100 are not used.

While certain presently preferred embodiments of the invention have been described and illustrated for purposes of clarity and example, various changes, modifications and substitutions will be apparent to those having only ordinary skill in the art without thereby departing from the invention as claimed below.

What is claimed is:

1. An optical interface for a 4-channel opto-electronic transmitter-receiver module, said module having a module housing including at least one housing wall, an opening in said housing wall, a transmitter chip comprising a 4-diode laser diode array and a receiver chip comprising a 4-diode photodetector array, said transmitter chip and said receiver chip mounted in said opening;

an optical head comprising a head body having a proximal face and a distal face, eight optical fibers extending through said head body, each of said fibers having a fiber end on each said face, the fibers ends on each of said proximal face and said distal face being grouped in two fiber end arrays, each array comprising four fiber ends evenly spaced from each other, said fiber end arrays being spaced apart from each other by a distance greeter than the spacing between adjacent fibers in said arrays, said head body secured to said module housing with said proximal face towards said housing wall and with each of said fiber end arrays in optical alignment with a corresponding one of said 4-diode laser diode array and said 4-diode photodetector array; and a 12-fiber optical transmission ribbon terminated at each of its opposite ends with a 12-fiber optical connector, the spacing between adjacent fibers of said optical transmission ribbon being even with the spacing between adjacent fiber ends in each of said fiber end arrays on said distal face, one said 12-fiber optical connector being optically coupled to said eight fiber ends of the two fiber end arrays on said distal face of the optical head body, such that eight optical fibers of said transmission ribbon are optically aligned with said eight fiber ends on said distal face and four optical fibers of said transmission ribbon remain unused for carrying optical signals to or from said module.

2. An optical interface for a 4-channel opto-electronic transmitter-receiver module, said optical interface comprising:

said module having a module housing including at least one housing wall, an opening in said housing wail, a transmitter chip comprising a 4-diode laser diode array and a receiver chip comprising a 4-diode photodetector array, said transmitter chip and said receiver chip mounted in said opening and having respective heat sinks;

an optical head comprising a head body having a proximal face and a distal face with respect to said module, said head body being formed of crystallized glass with a heat sink for releasing heat generated by said 4-diode laser diode array and said 4-diode photodetector array, eight optical fibers extending through said head body, each of said optical fibers having a fiber end on each of said proximal face and said distal face, the fiber ends on each of said proximal face and said distal face being grouped in two fiber end arrays, each array comprising four fiber ends evenly spaced apart from each other, said two fiber end arrays being spaced apart from each other by a distance greater than the spacing between adjacent optical fibers in said arrays, said head body secured to said module housing with said proximal face towards said housing wall, each of said fiber end arrays being positioned in optical alignment with a corresponding one of said 4-diode laser diode array and said 4-diode photodetector array, said heat sinks of said transmitter chip and said receiver chip being spot-welded to said heat sink of said head body; and a 12-fiber optical transmission ribbon terminated at each of its opposite ends with a 12-fiber optical connector, the spacing between adjacent fibers of said optical transmission ribbon being even with the spacing between adjacent fiber ends in each of said fiber end arrays on said distal face, one said 12-fiber optical connector being optically coupled to said eight fiber ends of the two fiber end arrays on said distal face of the optical head body, such that eight optical fibers of said transmission ribbon are optically aligned with said eight fiber ends on said distal face and four optical fibers of said transmission ribbon remain unused for carrying optical signals to or from said module.

3. The optical interface of claim 2 wherein said optical head has a receptacle structure having a guide hole for positioning said optical fiber connector.

4. The optical interface of claim 2 wherein said optical head is soldered to said module, and said module has an air-tight enclosed structure.

5. An optical interface for a N-channel opto-electronic transmitter-receiver module, said module having a module housing including at least one housing wall, an opening in said housing wall, a transmitter chip comprising a N-diode laser diode array and a receiver chip comprising a N-diode photodetector array, said transmitter chip and said receiver chip mounted in said opening;

an optical head comprising a head body having a proximal face and a distal face, eight optical fibers extending through said head body, each of said fibers having a fiber end on each said face, the fibers ends on each of said proximal face and said distal face being grouped in two fiber end arrays, each array comprising N fiber ends evenly spaced from each other, said fiber end arrays being spaced apart from each other by a distance greater than the spacing between adjacent fibers in said arrays, said head body secured to said module housing with said proximal face towards said housing wall and with each of said fiber end arrays in optical alignment with a corresponding one of said N-diode laser diode array and said N-diode photodetector array; and a 2N+M fiber optical transmission ribbon terminated at each of its opposite ends with a 2N+M fiber optical connector, the spacing between adjacent fibers of said optical transmission ribbon being even with the spacing between adjacent fiber ends in each of said fiber end arrays on said distal face, one said 2N+M fiber optical connector being optically coupled to said 2N fiber ends of the two fiber end arrays on said distal face of the optical head body, such that 2N optical fibers of said transmission ribbon are optically aligned with said 2N fiber ends on said distal face and a number M of optical fibers of said transmission ribbon remain unused for carrying optical signals to or from said module.

6. The optical interface of claim 5 wherein N equals 4, 2N equals 8, M equals 4 and 2N+M equals 12.

7. An optical interface for a N-channel opto-electronic transmitter-receiver module, said optical interface comprising:

said module having a module housing including at least one housing wall, an opening in said housing wall, a transmitter chip comprising a N-diode laser diode array and a receiver chip comprising a N-diode photodetector array, said transmitter chip and said receiver chip mounted in said opening and having respective heat sinks;

an optical head comprising a head body having a proximal face and a distal face with respect to said module, said head body being formed of crystallized glass with a heat sink for releasing heat generated by said N-diode laser diode array and said N-diode photodetector array, 2N optical fibers extending through said head body, each of said optical fibers having a fiber end on each of said proximal face and said distal face, the fiber ends on each of said proximal face and said distal face being grouped in two fiber end arrays, each array comprising N fiber ends evenly spaced apart from each other, said two fiber end arrays being spaced apart from each other by a distance greater than the spacing between adjacent optical fibers in said arrays, said head body secured to said module housing with said proximal face towards said housing wall, each of said fiber end arrays being positioned in optical alignment with a corresponding one of said N-diode laser diode array and said N-diode photodetector array, said heat sinks of said transmitter chip and said receiver chip being spot-welded to said heat sink of said head body; and a 2N+M-fiber optical transmission ribbon terminated at each of its opposite ends with a 2N+M-fiber optical connector, the spacing between adjacent fibers of said optical transmission ribbon being even with the spacing between adjacent fiber ends in each of said fiber end arrays on said distal face, one said 2N+M-fiber optical connector being optically coupled to said 2N fiber ends of the two fiber end arrays on said distal face of the optical head body, such that 2N optical fibers of said transmission ribbon are optically aligned with said 2N fiber ends on said distal face and a number M of optical fibers of said transmission ribbon remain unused for carrying optical signals to or from said module.

8. The optical interface of claim 7 wherein said optical head has a receptacle structure having a guide hole for positioning said optical fiber connector.

9. The optical interface of claim 7 wherein said optical head is soldered to said module, and said module has an air-tight enclosed structure.

10. The optical interface of claim 7 wherein N equals 4, 2N equals 8, M equals 4 and 2N+M equals 12.

* * * * *